Aug. 16, 1932.  W. A. CHRYST  1,871,957
OSCILLATING PIVOT JOINT
Filed May 28, 1929

Inventor
William A. Chryst
By Spencer Hardman & Fehr
His Attorneys

Patented Aug. 16, 1932

1,871,957

UNITED STATES PATENT OFFICE

WILLIAM A. CHRYST, OF DAYTON, OHIO, ASSIGNOR TO DELCO PRODUCTS CORPORATION, OF DAYTON, OHIO, A CORPORATION OF DELAWARE

OSCILLATING PIVOT JOINT

Application filed May 28, 1929. Serial No. 366,691.

This invention relates to an oscillating pivot joint wherein the two members connected thereby are isolated from one another by a resilient non-metallic material such as soft rubber.

An object of this invention is to provide such a pivot joint which is efficient and long-lasting in use and which is economical to manufacture.

A more specific object is to provide that small oscillations between the two connected members will be permitted by internal distortion in the resilient non-metallic material without material slipping between any surfaces, while relatively large oscillations between said members will cause a relative slipping between certain metal bearing surfaces adapted to this purpose.

Another object is to provide such a pivot joint wherein the central pivot member is supported by a bushing of soft rubber or other similar material held compressed thereupon by an exterior metal collapsible sleeve which in turn is frictionally supported within a cylindrical bearing.

Further objects and advantages of the present invention will be apparent from the following description, reference being had to the accompanying drawing, wherein a preferred embodiment of one form of the present invention is clearly shown.

In the drawing.

Similar reference characters refer to similar parts throughout the several views.

Figure 1:
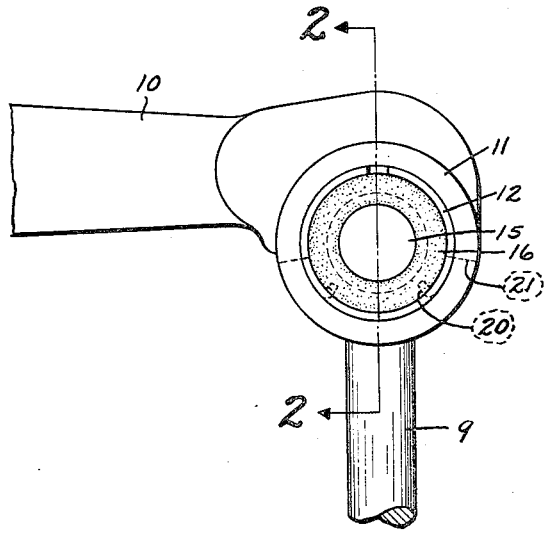
Fig. 1 is a side elevation of an oscillating pivot joint connecting two relatively swinging links, such as the lever arm and its connected link of hydraulic shock absorbers used on present day automobiles.

Numeral 10 designates the lever arm having an eye portion 11 at its extremity having a smooth cylindrical bore. Within eye 11 the slightly collapsible split sleeve 12 fits snugly and rotatably, but with a predetermined amount of friction due to the tendency of sleeve 12 to expand its diameter. A central pivot pin 15 surrounded by a resilient soft rubber bushing 16 is retained within the split sleeve 12, the rubber bushing 16 being held under compression by collapsing the sleeve 12 thereupon and then forcing the assembled pin 15, bushing 16, and sleeve 12 within the eye 11. Sleeve 12 has a peripherally extending slot 20 on its lower side and eye 11 has a somewhat wider and longer slot 21 centered with slot 20. The link 9 extends through these slots 20 and 21 and is rigidly fixed to the central pin 15 by being screwed into the threaded recess 14 therein. The soft rubber bushing 16 is of course provided with an aperture in registration with slots 20 and 21 of sufficient size to permit link 9 to be passed therethrough. Preferably sleeve 12 has a small inwardly turned flange 22 (see Fig. 2) surrounding the slot 20 therein, which flange minimizes any tendency of the soft rubber to bulge out at the narrow opening adjacent link 9 (see Fig. 3).

In operation, forces may be transmitted from link 9 to lever 10, or vice versa, through the resilient rubber bushing 16 which therefore provides a resilient non-metallic connection. Small angular swinging of link 9 to the right or left (as seen in Fig. 1) is permitted by an internal twist within the rubber bushing 16 and without any slipping of any surface upon another. Thus when this joint is used on leaf spring shock absorbers found on present day automobiles, the vast majority of the relative angular movements between the lever 10 and link 9 will be taken by the internal twist within the rubber bushing, thus avoiding substantially all wear of the parts. However, for the larger relative angular movements between lever 10 and link 9, the sleeve 12 will slip within the smooth bore of eye 11, the longer slot 21 in eye 11 providing proper clearance for the maximum swing of link 9. Preferably the outer surface of sleeve 12 is provided with some suitable self-lubricating means such as a large number of small shallow recesses 13 containing a graphite compound or similar lubricating material which will remain in place for long periods of time. (See Fig. 3.) The resilient rubber bushing 16 forces the split sleeve 12 into pressure contact with the inner bore of eye 11 at all times and thus provides the desired amount of friction between these two parts, which friction holds sleeve 12 and eye 11 relatively stationary during the relatively small angular movements of lever 10 and link 9 described above. Such small oscillations therefore cause only an internal distortion or twist in the rubber bushing 16 and hence no wear on sleeve 12 or eye 11.

Figure 2:
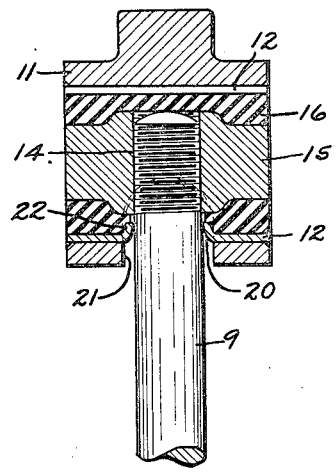
Fig. 2 is a section on line 2—2 of Fig. 1.
Figure 3:
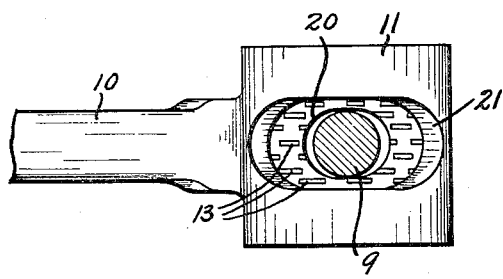
Fig. 3 is a bottom view of Fig. 1.

Small lateral swinging of link 9 to the right or left, as seen in Fig. 2, is also permitted by the distortion of the resilient rubber bushing 16, as will be obvious from the drawing. The small flanges 22 should provide sufficient clearance for such lateral swinging as may be desired.

While the form of embodiment of the present invention, as herein described, constitutes a preferred form, it is to be understood that other forms might be adopted, all coming within the scope of the claim which follows.

What is claimed is as follows:

A pivot joint connecting two relatively oscillating parts, comprising: a central pivot member rigid with one of said parts, a resilient bushing surrounding said pivot member, a sleeve surrounding said bushing and an eye having a frictional bearing upon said sleeve and rigid with the other of said connected parts, said eye and sleeve each having a peripherally extending slot therein through which said first connected part extends.

In testimony whereof I hereto affix my signature.

WILLIAM A. CHRYST.